(12) United States Patent
Yamazaki

(10) Patent No.: US 7,609,470 B2  
(45) Date of Patent: Oct. 27, 2009

(54) INFORMATION STORAGE DEVICE, WRITE CURRENT ADJUSTMENT METHOD FOR THE INFORMATION STORAGE DEVICE, AND WRITE CONTROL CIRCUIT

(75) Inventor: Yuichiro Yamazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 247 days.

(21) Appl. No.: 11/452,841

(22) Filed: Jun. 14, 2006

(65) Prior Publication Data

US 2007/0211365 A1 Sep. 13, 2007

(30) Foreign Application Priority Data

Mar. 10, 2006 (JP) .............................. 2006-065452

(51) Int. Cl.  
*G11B 5/02* (2006.01)

(52) U.S. Cl. .............................. 360/68; 360/31; 360/46

(58) Field of Classification Search ........................ None  
See application file for complete search history.

(56) References Cited

U.S. PATENT DOCUMENTS

| | | | | |
|---|---|---|---|---|
| 6,064,534 A | * | 5/2000 | Simozato | 360/46 |
| 6,449,110 B1 | * | 9/2002 | DeGroat et al. | 360/46 |
| 2004/0169953 A1 | * | 9/2004 | Yun et al. | 360/66 |
| 2004/0174627 A1 | * | 9/2004 | Kim et al. | 360/31 |
| 2005/0264909 A1 | * | 12/2005 | Lee et al. | 360/68 |

* cited by examiner

*Primary Examiner*—Jason C Olson  
(74) *Attorney, Agent, or Firm*—Greer, Burns & Crain, Ltd.

(57) ABSTRACT

There is provided a magnetic disk device or the like which is capable of improving signal quality by suppressing occurrence of erasure of adjacent tracks due to spreading of a writing spot. The magnetic disk device is capable of controlling a steady state value of a write current for writing into a magnetic disk, an overshoot value, or a width thereof. The magnetic disk device comprises a VMM measurement section that measures a VMM, and a write current setting section that sets the write current, based on a value of the VMM measured by the VMM measurement section, such that a data writing spot is prevented from spreading during writing into the medium and occurrence of side erasure is prevented.

15 Claims, 8 Drawing Sheets

O/S=5

| WT TIMES | WT TIMES(log) | OS=0 | OS=1 | OS=2 | |
|---|---|---|---|---|---|
| 3 | 0.477 | 2.816 | 2.847 | 2.85 | |
| 1000 | 3.000 | 2.907 | 2.967 | 3.03 | ACTUAL MEASUREMENT |
| 20000 | 4.301 | 2.991 | 3.083 | 3.2 | |
| 100000 | 5.000 | 3.04 | 3.16 | 3.33 | |
| 1000000 | 6.000 | 3.15 | 3.30 | 3.55 | PREDICTION |
| | | | | | |

WHERE VMM = 3.4 IS GUARANTEED,
OS = 1, 2, 3 IS SATISFIED AT 100 THOUSAND TIMES (5.0@Log).
AT MILLION TIMES (6.0@Log), OS = 2 IS NOT SATISFIED.

INFORMATION STORAGE DEVICE, WRITE CURRENT ADJUSTMENT METHOD FOR THE INFORMATION STORAGE DEVICE, AND WRITE CONTROL CIRCUIT

BACKGROUND OF THE INVENTION

1. Field of the Invention

The present invention relates to an information storage device such as a magnetic disk device, and particularly to an information storage device capable of automatically adjusting a write current on the basis of a measured value of VMM (Viterbi Metric Margin), a write current adjustment method for the information storage device, and a write control circuit. Note that VMM is sometimes called CSM (Channel Statistics Measurement). However, the term of VMM is selected in the present specification.

2. Description of the Related Art

Setting values such as a write current value and an overshoot value (abbreviated as an O/S) in a magnetic disk recording/reproducing device which forms part of a magnetic disk device vary depending on the writing ability of a head, the way or condition of writing into a medium, and the like. Therefore, in usual cases, a margin is measured and the setting values are determined so as to optimize the margin. This method aims mainly at optimization against differences in characteristics between media and in writing performance between heads. Importance is hence given to writability. Known reference technology as prior art is, for example, Patent Document 1 (Jpn. Pat. Appln. Laid-Open Publication No. 2005-93054.

However, recording density and track density have been raised to be higher in recent years. As importance has been given to writing ability of a head, a problem has arisen in that spreading of a writing spot causes erasure on tracks adjacent to or in the periphery of a written track. In other words, there conspicuously appears a phenomenon that side erasure occurs more easily as the writing ability of a head or medium is raised higher. This side erasure causes the following problems, for example.

At first, as the first problem, if the write current is set with a VMM known as a conventional method used for optimizing the write current, an offset margin, and a TPI (Track Per Inch) margin, there appears a phenomenon that side erasure is caused particularly by a combination of a head and a medium which have high writability. The VMM is defined by a number in case where difference between metric values based on two paths decreases below a certain threshold value. The VMM is given as a total sum when reading 100 sectors (about 400,000 bits).

Side erasure is a phenomenon as follows. That is, in addition to a magnetic field from an write gap which has been originally existing, a magnetic flux leaks from a write magnetic pole to a portion other than the track on which data should originally be written, thereby to erase original data. Depending on the shapes of magnetic poles of the head, this phenomenon easily occurs.

FIG. 3 shows write/read area 1 with respect to a write core WC of a data head, an outer adjacent tracks 2 and an inner adjacent track 3 on both sides of the region 1, a gap write area 4, and areas 5 where side erasure occurs.

The second problem is signal quality immediately after starting writing. At an actual start of writing, writing performance is ordinarily worse than in a steady state. This is greatly influenced by an element that is near a write head and projects as a write current flows. When the write current starts flowing, the element near the write head floats up high due to the projection. The floating height of the element thereafter falls gradually.

When the write current comes into a steady state, i.e., while a write operation continues, the projection of the element is substantially in a steady state. With respect to floating during writing, normally, as the floating height from a medium becomes lower, the writing ability rises.

Considering a period immediately after writing, the projection of the element by the write current is not yet stable, and as a result, the floating height of the element is higher than in a steady state. Therefore, the writing ability is still low. This is usually called a low lead O/W. If writing is executed in this state, there is a case that the lead margin deteriorates extremely and the signal quality lowers. In this case, the write current and O/S value need to be increased, on the contrary to the direction of solution to the first problem. In actual, however, no optimum values have been determined in consideration of these problems.

SUMMARY OF THE INVENTION

The present invention has been made to solve the problems described above, and has an object of providing an information storage device, a write current adjustment method for the information storage device, and a write control circuit, which are capable of improving signal quality by suppressing occurrence of erasure on adjacent tracks due to spreading of a writing spot. Another object of the present invention is to provide an information storage device, a write current adjustment method for the information storage device, and a write control circuit, which are capable of preventing insufficient writing from being caused by external factors such as environmental changes, at a lead portion where writing weakens.

To achieve the above objects, according to the present invention, there is provided an information storage device being capable of controlling a steady state value of a write current for writing into a recording medium, an overshoot value, or a width thereof, the device comprising: a VMM measurement section that measures a VMM; and a write current setting section that sets the write current, based on a value of the VMM measured by the VMM measurement section, such that a data writing spot is prevented from spreading during writing into the medium and occurrence of side erasure is prevented.

The information storage device according to the present invention further comprises a side erasure occurrence prediction section that predicts occurrence or nonoccurrence of side erasure by use of actually measured values measured by the VMM measurement section with respect to at least two numbers of times of writing, wherein the write current setting section sets the write current, based on a predicted value predicted by the side erasure occurrence prediction section.

In the information storage device according to the present invention, the side erasure occurrence prediction section predicts, by linear interpolation, occurrence or nonoccurrence of side erasure with respect to a tolerance value of side erasure.

In the information storage device according to the present invention, the VMM measurement section further measures a value of a lead VMM at the beginning of writing into the recording medium, and the write current setting section sets the write current so as to prevent deterioration in signal quality at the beginning of writing, based on the measured value of the lead VMM.

Also according to the present invention, there is provided an information storage device being capable of controlling a steady state value of a write current for writing into a recording medium, an overshoot value, or a width thereof, the device comprising: a VMM measurement section that measures a VMM; and a write current setting section that sets the write current so as to prevent deterioration in signal quality at the beginning of writing, based on a measured value of the lead VMM measured by the VMM measurement section at the beginning of writing into the recording medium.

In the information storage device according to the present invention, the write current setting section sets any one of a steady state current, an overshoot value, or an overshoot width to be adjusted as the write current.

The information storage device according to the present invention further comprises a write precompensation value adjustment section that adjusts a write precompensation value as a parameter of a write system, wherein the VMM measurement section measures the VMM with respect to a setting value of the write current adjusted by the write precompensation value adjustment section.

Further, according to the present invention, there is provided a write current adjustment method for an information storage device being capable of controlling a steady state value of a write current for writing into a recording medium, an overshoot value, or a width thereof, the method comprising: a VMM measurement step that measures a VMM; and a write current setting step that sets the write current, based on a value of the VMM measured by the VMM measurement step, such that a data writing spot is prevented from spreading during writing into the medium and occurrence of side erasure is prevented.

The write current adjustment method for an information storage device, according to the present invention, further comprises a side erasure occurrence prediction step that predicts occurrence or nonoccurrence of side erasure by use of actually measured values measured by the VMM measurement step with respect to at least two numbers of times of writing, wherein the write current setting step sets the write current, based on a predicted value predicted by the side erasure occurrence prediction step.

In the write current adjustment method for an information storage device, according to the present invention, the side erasure occurrence prediction step predicts, by linear interpolation, occurrence or nonoccurrence of side erasure with respect to a tolerance value of side erasure.

In the write current adjustment method for an information storage device, according to the present invention, the VMM measurement step measures a value of a lead VMM at the beginning of writing into the recording medium, and the write current setting step sets the write current so as to prevent deterioration in signal quality at the beginning of writing, based on the measured value of the lead VMM.

In the write current adjustment method for an information storage device, according to the present invention, the write current setting step sets any one of a steady state current, an overshoot value, or an overshoot width to be adjusted as the write current.

The write current adjustment method for an information storage device, according to the present invention, further comprises a write precompensation value adjustment step that adjusts a write precompensation value as a parameter of a write system, wherein the VMM measurement step measures the VMM with respect to a setting value of the write current adjusted by the write precompensation value adjustment step.

Further, according to the present invention, there is provided a write current adjustment program to make a computer execute a write current adjustment method for an information storage device capable of controlling a steady state value of a write current for writing to store information, an overshoot value, or a width thereof, the program comprising: a VMM measurement step that measures a VMM; and a write current setting step that sets the write current, based on a value of the VMM measured by the VMM measurement step, such that a data writing spot is prevented from spreading during writing into a medium and occurrence of side erasure is prevented.

According to the present invention, an advantage is obtained in that signal quality can be improved by suppressing occurrence of erasure on adjacent tracks due to spreading of a writing spot. Another advantages is that at a lead portion where writing weakens, insufficient writing can be prevented from being caused by external factors such as environmental changes.

DETAILED DESCRIPTION OF THE PREFERRED EMBODIMENTS

An embodiment of the present invention will now be described with reference to the drawings.

Figure 1:
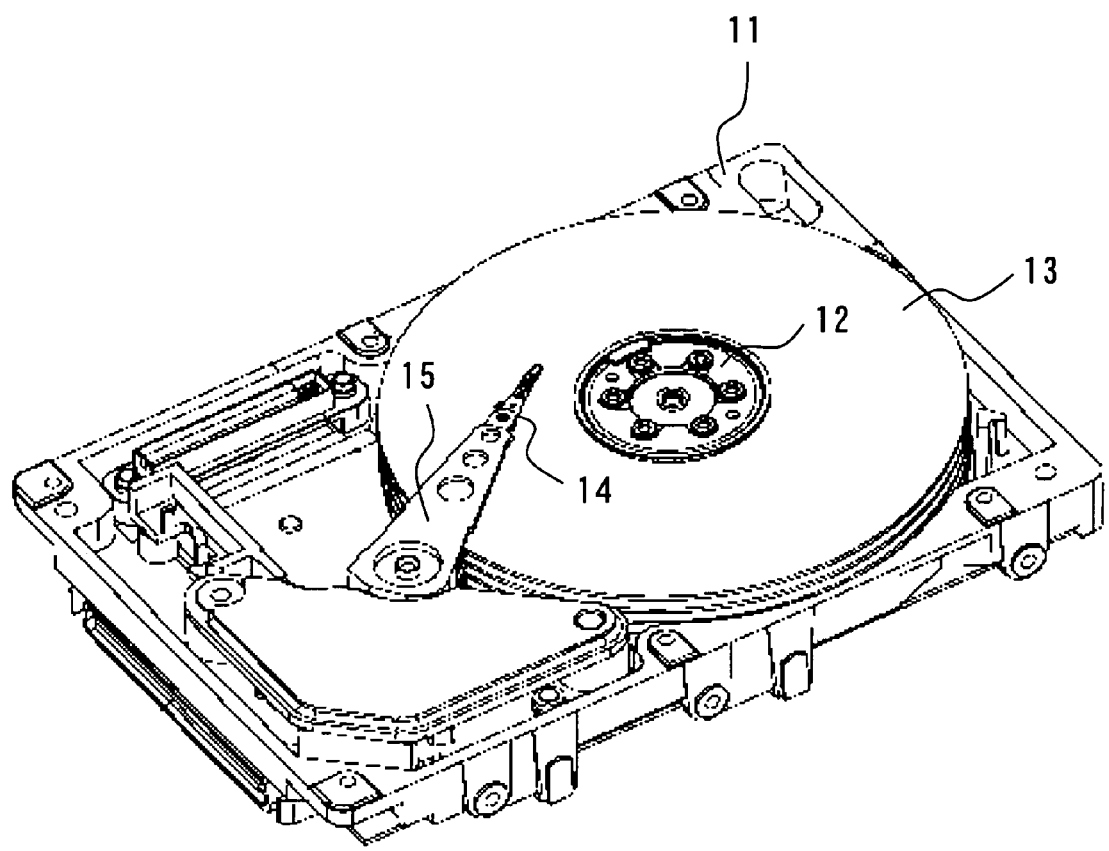
FIG. 1 is an overall perspective view showing a magnetic disk device according to the embodiment of the present invention.
Figure 2:
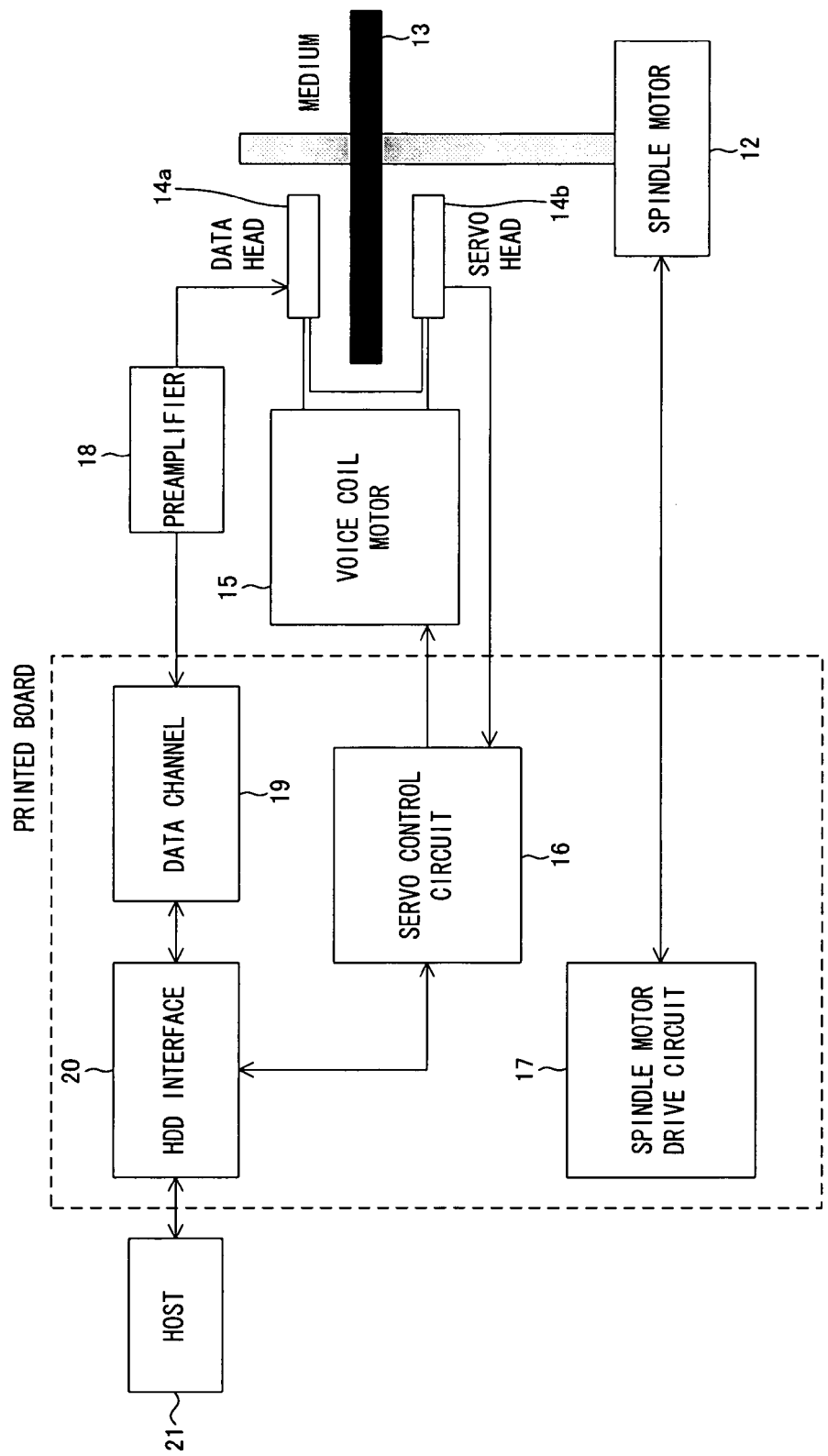
FIG. 2 is an overall block diagram of the magnetic disk device shown in FIG. 1.

FIG. 1 is a perspective view showing the whole structure of an information storage device according to the embodiment of the present invention. FIG. 2 is a block diagram thereof. In this device, a spindle motor 12 is secured to a base 11, and a medium 13 is arranged rotatable by the spindle motor 12. On the surface of the medium, a head 14 is provided to be able to swing freely. This head 14 is driven by an actuator (voice coil motor) 15. The actuator 15 is controlled by a servo control circuit 16. The spindle motor 12 is driven by a spindle motor drive circuit 17.

A data head 14a and a servo head 14b are formed at a slider part of the head 14. Servo data detected by the servo head 14b is given to the servo control circuit 16. The data head 14a is connected to a preamplifier 18, and is connected to a host 21 through a data channel 19 and an HDD interface 20. The preamplifier 18 is an IC which mainly amplifies a read signal from the head. A signal outputted from the preamplifier 18 is amplified by RWLSI (read channel). The preamplifier 18 adjusts and sets a write current in the embodiment according to the present invention.

In the structure as described above, the embodiment according to the present invention prevents (or suppresses) occurrence of side erasure and improves write signal quality at the beginning of writing. This embodiment describes a case of adjusting only the O/S value as a parameter of a write current. However, a steady state current value and the width of the O/S value which are other parameters of the write current can be treated based on a similar concept. A description thereof will be omitted herefrom.

Described first will be a measure to prevent (or reduce occurrence of) side erasure as the first problem described above. In the present embodiment, write operation is carried out a certain number of times to check whether side erasure can be allowed or not. In a method of checking this, the VMM is measured with respect to the number of times of writing.

As the number of times of writing increases, the VMM at the corresponding portion varies substantially linearly due to the influence of side erasure. Accordingly, occurrence or non-occurrence of side erasure can be determined/predicted by measuring the VMM. If side erasure is determined to occur at a certain write current value, adjustment is made to reduce the write current, and a test thereof is made again. As a result of this, such a write current that does not cause side erasure is set.

Described next will be the second problem that signal quality immediately after writing has to be improved with respect to combinations of a head and a medium which degrade the writing performance, in contrast to the problem of the side erasure. In this respect, the margin at the beginning of writing (hereinafter abbreviated as a lead VMM) is measured. In this manner, if this margin lowers below a certain value with respect to a head having inferior writing performance, an operation to raise the write current is activated and improves the writing performance.

Since this structure is adopted, a proper write current value or overshoot value which does not cause side erasure can be set in case of occurrence of a phenomenon that side erasure takes place regardless of adjustment made to the write current (e.g., a steady state value, O/S value, or width thereof) in the write system. Simultaneously, an optimum value can be determined considering excessive reduction of the write current since the writing performance is checked. Therefore, writing errors at the beginning can be avoided as much as possible.

Hereinafter, operation of the embodiment according to the present invention will be described in case where the operation is configured to be able to solve the first and second problems as described above.

Figure 4:
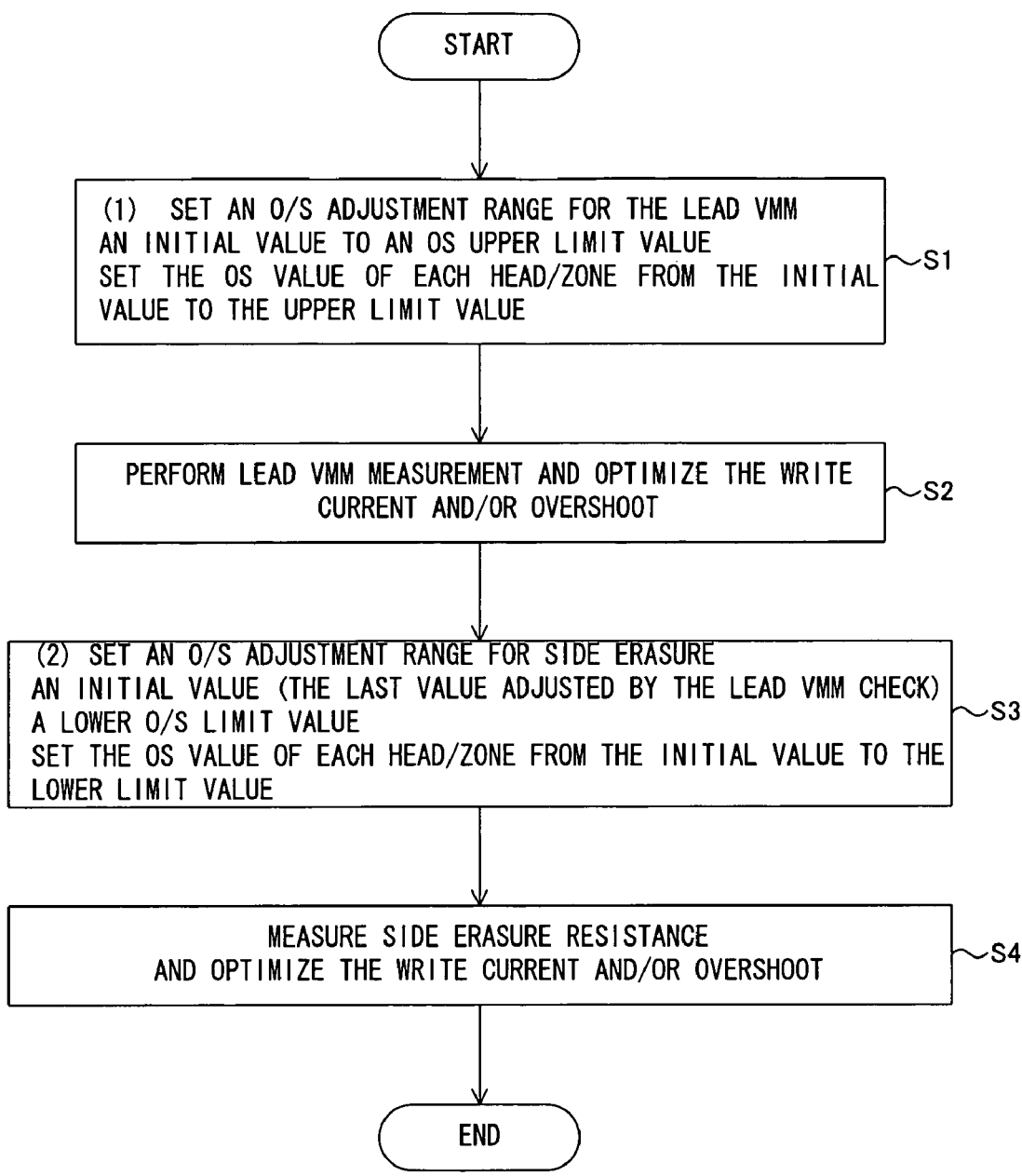
FIG. 4 is a flowchart showing overall operation of the present embodiment.

FIG. 4 is a flowchart showing the whole flow of optimization of the write current (the O/S value in this case) in the embodiment according to the present invention.

In this flow, the first point to which attention should be paid is an adjustment method considering the lead O/W (i.e., the write performance immediately after write operation). At first, an adjustment range of the O/S value for the lead VMM is set (step S1).

Then, as a measure to monitor the signal quality at the beginning, the VMM value is measured. At this time, the lead VMM (several blocks) is measured for every sector. If the lead VMM does not satisfy a certain value, the write current and/or the overshoot is increased. As a result, the write current and/or the overshoot is set such that the lead VMM might not drop (step S2).

Next, for the second point, the O/S value is adjusted such that side erasure might not occur. At first, an adjustment range of the O/S value for side erasure is set (step S3).

Then, side erasure resistance is measured. If side erasure has occurred, the write current and/or the overshoot is changed in the descendent direction, in contrast to the foregoing case of increasing the write current and/or the overshoot. Further, an O/S value which does not cause an unrecovered error due to side erasure is determined (step S4).

Figure 5:
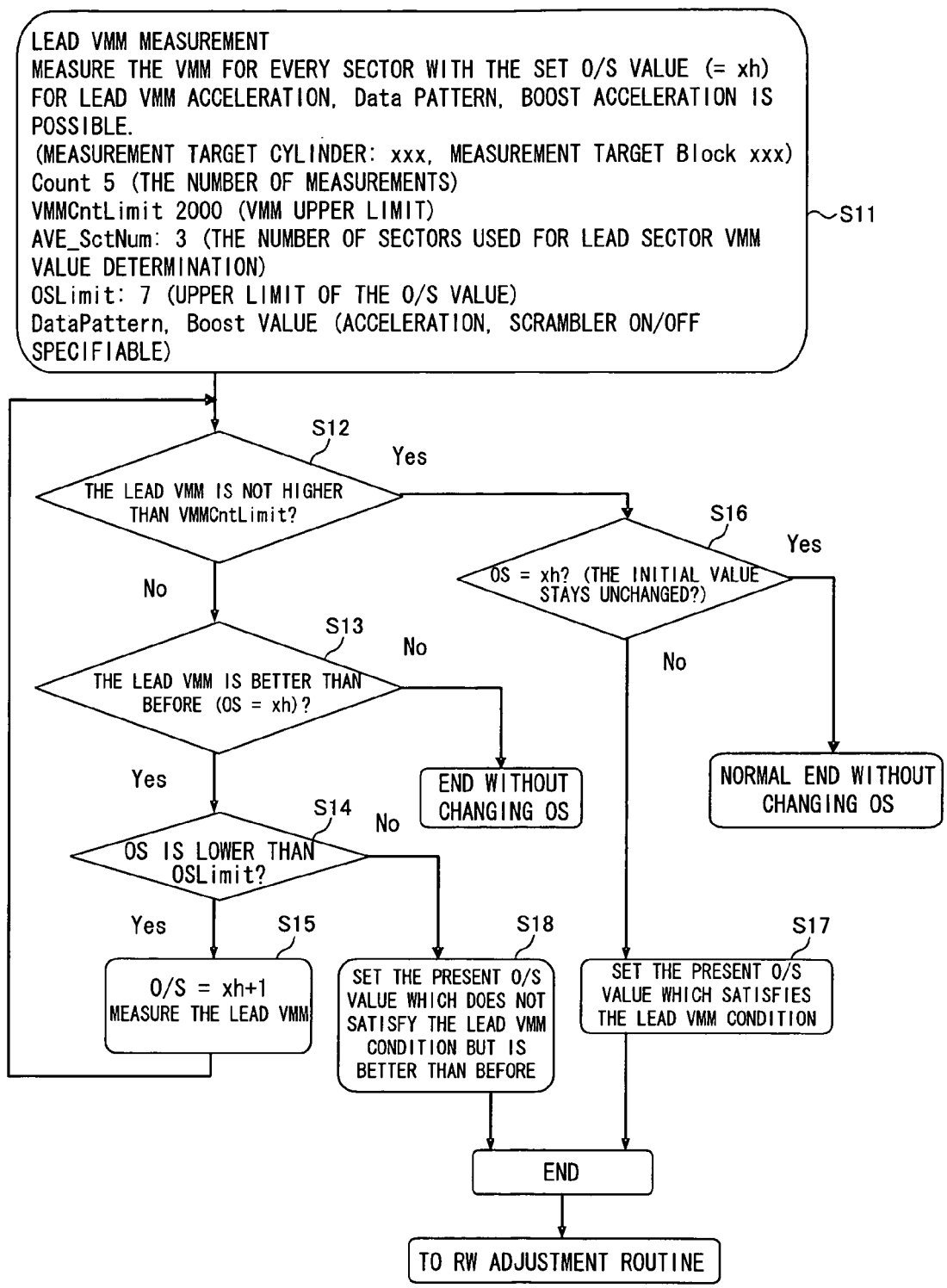
FIG. 5 is a flowchart showing a check routine for a lead VMM.

Described next will be a method of optimizing the write current by measuring the lead VMM value and by adjusting the O/S value to obtain excellent lead O/W. FIG. 5 is a flowchart showing this operation.

At first, an initial O/S value is set. With this setting value, the lead VMM is measured (step S11). If the lead VMM is not greater than a certain value (step S12, No), whether or not this value is better than before is determined (step S13). If this value is determined as being better (step S13, Yes) and if this value is smaller than an upper limit (step S14, Yes), the O/S value is raised one rank up, and measurement of the lead VMM is repeated (step S15).

In the step S12, if the lead VMM value is not greater than the certain value (step S12, Yes), whether or not the O/S value stays unchanged from the initial value is determined (step S16). If the value stays unchanged from the initial value (step S16, Yes), this flow ends normally without changing the O/S value. Otherwise, if the value does not stay unchanged from the initial value (step S16, No), the present O/S value which satisfies lead VMM conditions is set (step S17).

In the step S13, if the lead VMM value is not better than before (step S13, No), the processing is terminated without changing the O/S value. In the step S14, if the O/S value is not smaller than the upper limit (step S14, No), the present O/S value which does not satisfy the lead VMM but attains a better condition than before is set (step S18), and the processing is terminated.

Thus, the measurement ends when the lead VMM satisfies the certain value. That is, a write current (O/S value) capable of ensuring the lead writing performance is obtained. After end of the processing, the processing transits to an RW adjustment routine. This routine is the same as a conventional RW adjustment routine, and a description thereof will be omitted herefrom.

According to the processing as described above, if the measured VMM is determined to be within a slice (tolerance value), as a result of determination after the first VMM measurement, the O/S value is not changed. If the VMM deteriorates after the O/S value is changed, the O/S value is not changed. A condition for changing the O/S value is the case that the lead VMM is set within a slice by the change or that the lead VMM is improved by changing the O/S value.

The O/S value thus optimized is finally subjected to Read/Write (R/W) calibration. The R/W calibration is the same as conventional calibration, and a description thereof will be omitted herefrom.

Figure 6:
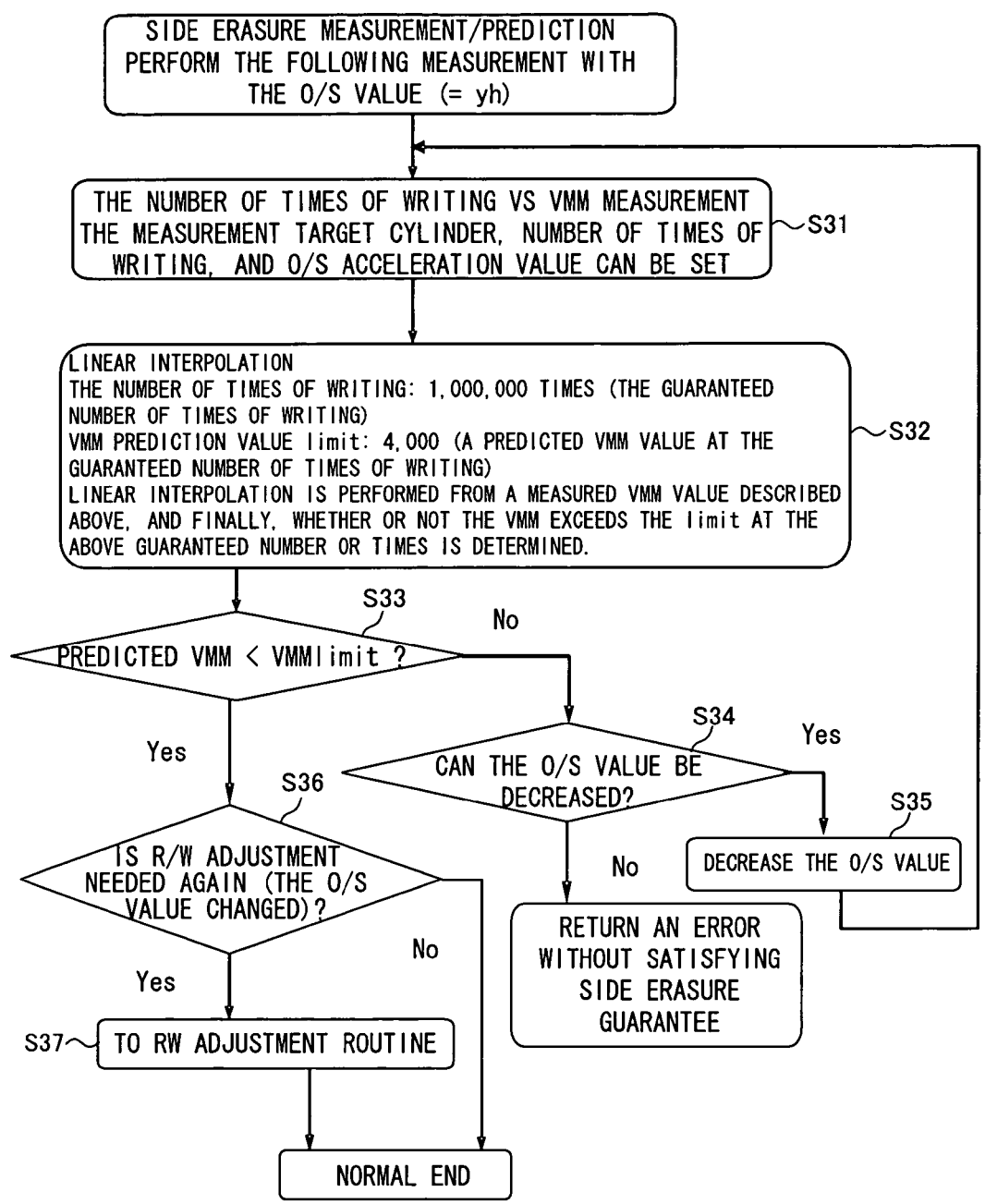
FIG. 6 is a flowchart showing a side erasure resistance check routine.

Next, measurement of side erasure resistance will be described. FIG. 6 is a flowchart showing processing for preventing side erasure. Excellent O/W can be obtained from the lead VMM value described above. Whether or not side erasure satisfies the tolerance value is measured next, with the O/S value set to prevent deterioration of write signal quality at the beginning of writing. As for the characteristics of side erasure, influence on adjacent cylinders strengthens as the number of times of writing increases. To observe this, VMM values are measured before and after writing, and the measured values are compared with each other.

In the measurement method thereof, VMM values of peripheral cylinders around a measurement target cylinder are measured first. Then, writing into the measurement target cylinder is repeated. Thereafter, VMM values of the peripheral cylinders around the measurement target cylinder are measured again (step S31). In this way, margins (VMM) relative to the number of times of writing can be understood.

Figure 3:
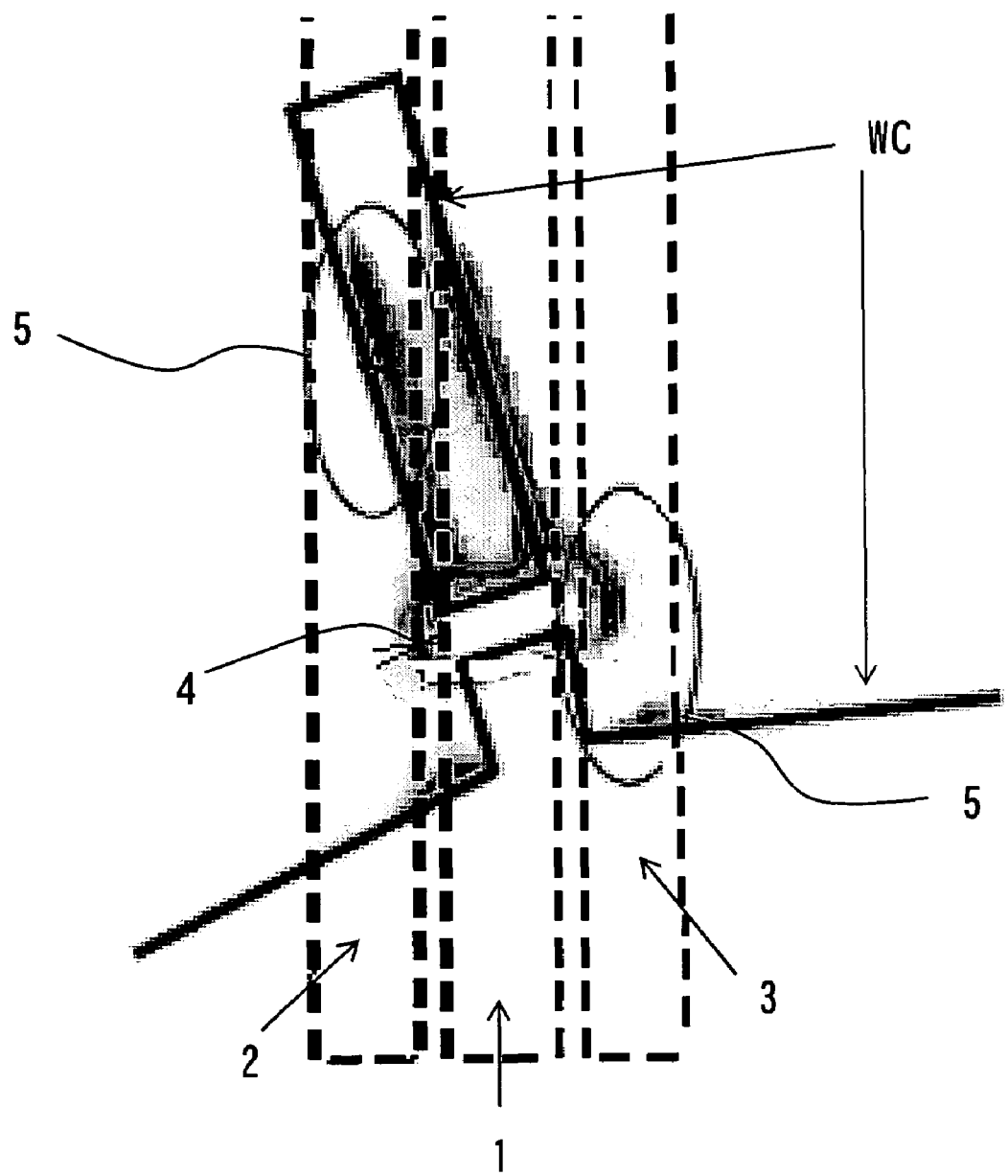
FIG. 3 shows tracks of a magnetic disk.

In the processing of FIG. 3, the VMM values are measured where the numbers of times of writing are 2,000 and 20,000.

From these VMM, whether or not the head will allow side erasure in the future is presumed by linear interpolation (step S32).

In actual operation, write operation at one location such as a customer is repeated not less than the number of times of writing as described above. That is, there is a case that write operation is performed several million times. However, if side erasure is measured several million times, a long measurement time is required and makes optimization impossible. To solve this problem, a presumed VMM is used.

From the numbers of times of writing, at least the VMM value between two points can be understood. Linear interpolation of the VMM is performed with respect to the number of times of writing.

Figures 7, 8:
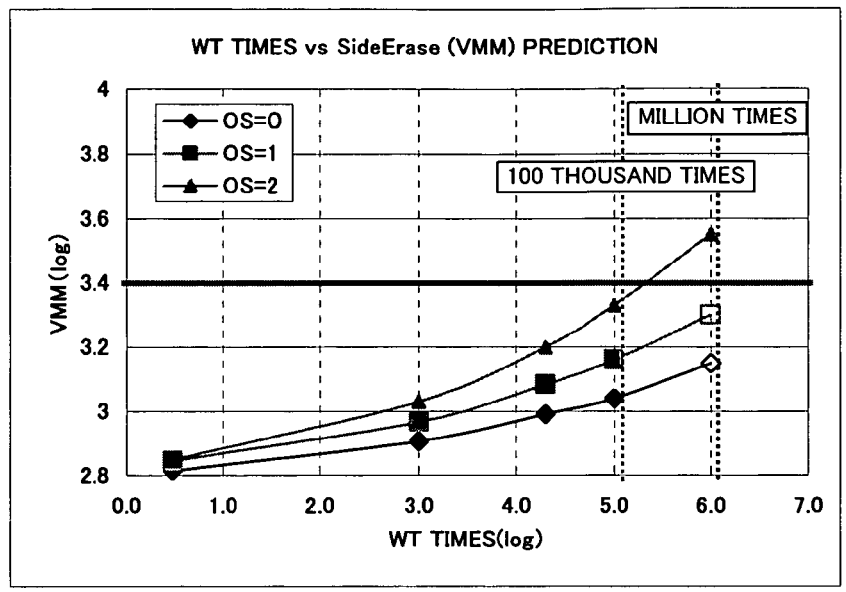
FIG. 7 is a prediction graph of VMM.
FIG. 8 shows a prediction table of VMM.

FIG. 7 shows VMM values relative to the numbers of times of writing. In this case, the VMM is an actually measured value with respect to the number of times of writing from 1,000 to 100,000. This figure shows VMM values at respective O/S values.

For example, if VMM=3.4 which corresponds to a tolerance value of side erasure is set, side erasure can be said to be satisfactory at 100,000 times in every case of O/S value=0, 1, and 2, as shown in FIG. 8. At 10 million times, however, the tolerance value is exceeded in O/S=2, and therefore, tolerance of side erasure is not satisfied.

As a result, even if the number of times of writing increases to several hundred or several ten million, the predicted VMM can be known. When this is done in actual operation, occurrence or nonoccurrence of side erasure can be predicted depending on whether or not the predicted VMM satisfies tolerance of side erasure. Further, if a tolerance value is exceeded, rejection is available in advance, and therefore, occurrence of side erasure can be suppressed.

Depending on the VMM thus predicted, whether or not the value satisfies a tolerance value is determined (step S33). If the tolerance value is not satisfied (step S33, No), the O/S value is reduced (step S35). As a constraint to this reduction, whether or not writing deteriorates with a reduced O/S value needs to be determined (step S34). This is because the O/S value can be lowered by the present routine for the side erasure only if the O/S value has not been raised by the foregoing routine for the lead VMM (i.e., if the original O/S value has not been changed) (step S34, Yes).

If the predicted VMM satisfies the tolerance value (step S33, Yes) and if the original O/S value has not been changed (step S36, No), the processing ends as it is. If the original O/S value has been changed (step S36, Yes), the R/W calibration is carried out again (step S37), and then, the processing ends.

Figure 9:
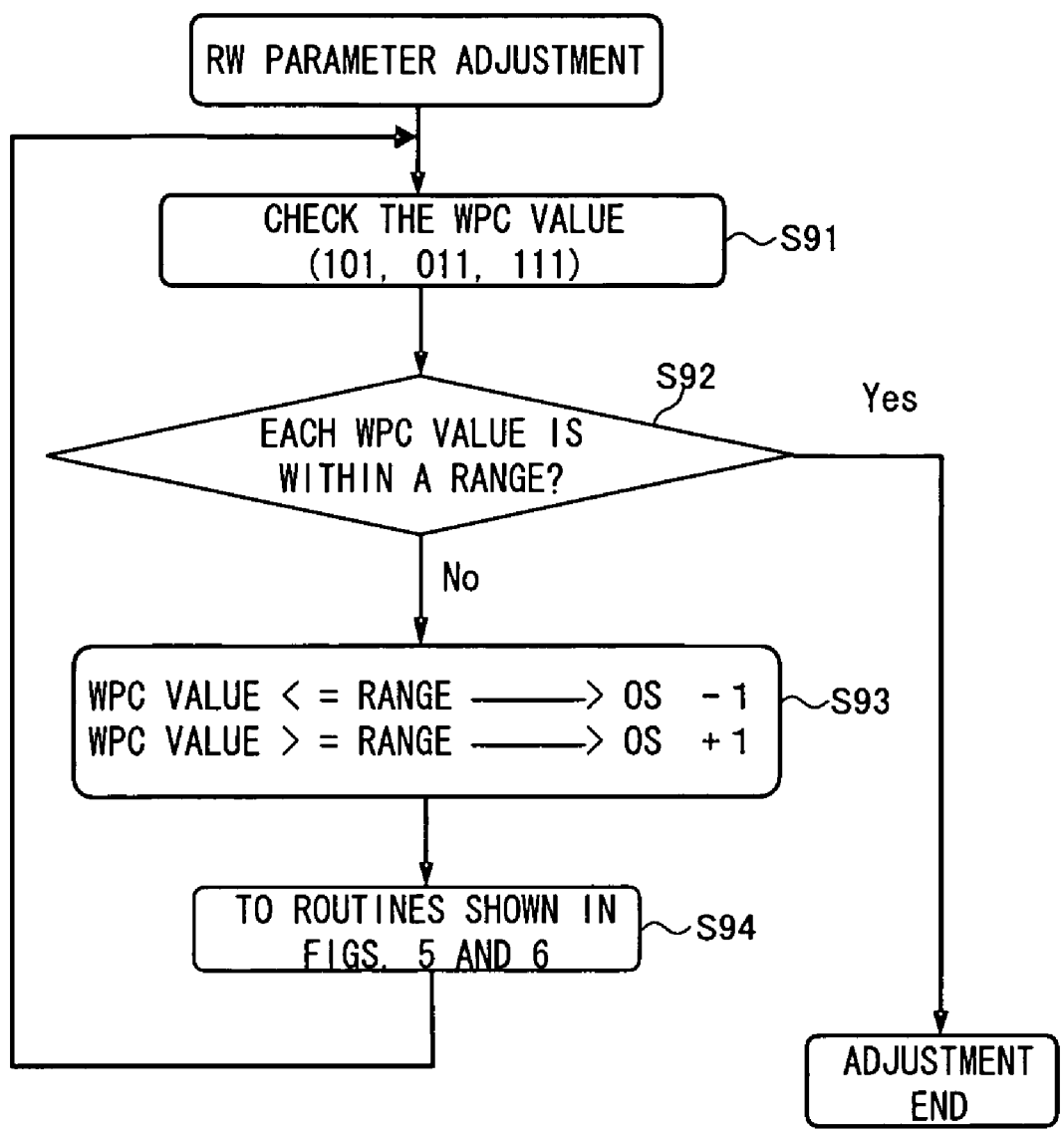
FIG. 9 is a flowchart showing a write precompensation value check routine.

FIG. 9 shows a check routine for an adjustment parameter. This routine is carried out before the operations shown in FIGS. 5 and 6. With the value thus set, the lead VMM value is measured and VMM prediction is carried out, as described above.

The contents of the routine are as follows. After checking a write precompensation (hereinafter abbreviated as WPC) value for an R/W parameter, the O/S (including width) of the write current is adjusted. At first, with the parameter subjected to R/W adjustment, the WPC value thereof is checked (step S91).

As the WPC value, a value (such as 011 or 111101) corresponding to a compensation amount for each bit can be set. However, each of WPC value can be checked. After the WPC check, if the WPC value exceeds a certain range (Step S92, No) and if the O/S of the write current is too small (insufficient writing ability), the O/S value is raised one rank up, to perform optimization of the O/S. On the contrary, if the WPC falls within the certain range, the O/S of the write current is too great (sufficient writing ability), the O/S value is lowered one rank down (step S93). The processing then goes to the routines shown in FIGS. 5 and 6.

From the write precompensation values subjected to R/W adjustment, an optimal O/S value is determined.

As has been described above, the embodiment according to the present invention is characterized in that the least necessary write current is determined at the lead portion where writing weakens, when the write current and/or overshoot value is determined. In this way, insufficient writing due to external factors such as environmental changes can be prevented. Further, by measuring occurrence or nonoccurrence of side erasure, erasure of adjacent tracks due to spreading of the writing spot can be suppressed advantageously. Since these optimization slice adjustments for the write system are performed, combinations of writing ability and media can cope with cases where the writing ability is varied in mass production. Therefore, the performance can be improved, and writing quality and reliability of a customer's device can also be improved.

What is claimed is:

1. An information storage device having a recording medium and a head to write information into the recording medium, and controlling a steady state value, an overshoot value or an overshoot width of a write current for writing into the recording medium, the device comprising:
   a Viterbi Metric Margin measurement section to measure a Viterbi Metric Margin; and
   a write current setting section to set the write current, based on a value of the Viterbi Metric Margin measured by the Viterbi Metric Margin measurement section, such that a data writing spot is prevented from spreading during writing into the medium and occurrence of side erasure is prevented;
   wherein the Viterbi Metric Margin measurement section further measures a value of a lead Viterbi Metric Margin at the beginning of writing into the recording medium, and the write current setting section sets the write current so as to prevent deterioration in signal quality at the beginning of writing, based on the measured value of the lead Viterbi Metric Margin.

2. The information storage device according to claim 1, wherein the write current setting section sets any one of the steady state current, the overshoot value, or the overshoot width to be adjusted as the write current.

3. The information storage device according to claim 1, further comprising a side erasure occurrence prediction section to predict occurrence or nonoccurrence of side erasure by use of actually measured values measured by the Viterbi Metric Margin measurement section with respect to at least two numbers of times of writing, wherein
   the write current setting section sets the write current, based on a predicted value predicted by the side erasure occurrence prediction section.

4. The information storage device according to claim 3, wherein the side erasure occurrence prediction section predicts, by linear interpolation, the occurrence or nonoccurrence of side erasure with respect to a tolerance value of side erasure.

5. The information storage device according to claim 1, further comprising a write precompensation value adjustment section that adjusts a write precompensation value as a parameter of a write system, wherein
   the Viterbi Metric Margin measurement section measures the Viterbi Metric Margin with respect to a setting value of the write current adjusted by the write precompensation value adjustment section.

6. A write current adjustment method for an information storage device controlling a steady state value, an overshoot value, or an overshoot width of a write current for writing into a recording medium, the method comprising:
  measuring a Viterbi Metric Margin; and
  setting the write current, based on a value of the measured Viterbi Metric Margin, such that a data writing spot is prevented from spreading during writing into the medium and occurrence of side erasure is prevented;
  wherein the measuring measures a value of a lead Viterbi Metric Margin at the beginning of writing into the recording medium, and the setting sets the write current so as to prevent deterioration in signal quality at the beginning of writing, based on the measured value of the lead Viterbi Metric Margin.

7. The write current adjustment method for an information storage device, according to claim 6, wherein the setting sets any one of the steady state current, the overshoot value, or the overshoot width to be adjusted as the write current.

8. The write current adjustment method for an information storage device according to claim 6, further comprising adjusting a write precompensation value as a parameter of a write system,
  wherein the measuring measures the Viterbi Metric Margin with respect to a setting value of the write current adjusted by the adjusting.

9. The write current adjustment method for an information storage device, according to claim 6, further comprising predicting occurrence or nonoccurrence of side erasure by use of actually measured values measured by the measuring with respect to at least two numbers of times of writing,
  wherein the setting sets the write current, based on a predicted value predicted by the predicting.

10. The write current adjustment method for an information storage device, according to claim 9, wherein the predicting predicts, by linear interpolation, the occurrence or nonoccurrence of side erasure with respect to a tolerance value of side erasure.

11. A write control circuit controlling a steady state value, an overshoot value, or an overshoot width of a write current for writing into a recording medium, the circuit comprising:
  a Viterbi Metric Margin measurement section to measure a Viterbi Metric Margin; and
  a write current setting section to set the write current, based on a value of the Viterbi Metric Margin measured by the Viterbi Metric Margin measurement section, such that a data writing spot is prevented from spreading during writing into the medium and occurrence of side erasure is prevented;
  wherein the Viterbi Metric Margin measurement section further measures a value of a lead Viterbi Metric Margin at the beginning of writing into the recording medium, and the write current setting section sets the write current so as to prevent deterioration in signal quality at the beginning of writing, based on the measured value of the lead Viterbi Metric Margin.

12. The write control circuit according to claim 11, wherein the write current setting section sets any one of the steady state current, the overshoot value, or the overshoot width to be adjusted as the write current.

13. The write control circuit according to claim 11, further comprising a side erasure occurrence prediction section to predict occurrence or nonoccurrence of side erasure by use of actually measured values measured by the Viterbi Metric Margin measurement section with respect to at least two numbers of times of writing,
  wherein the write current setting section sets the write current, based on a predicted value predicted by the side erasure occurrence prediction section.

14. The write control circuit according to claim 13, wherein the side erasure occurrence prediction section predicts, by linear interpolation, the occurrence or nonoccurrence of side erasure with respect to a tolerance value of side erasure.

15. The write control circuit according to claim 11, further comprising a write precompensation value adjustment section that adjusts a write precompensation value as a parameter of a write system,
  wherein the Viterbi Metric Margin measurement section measures the Viterbi Metric Margin with respect to a setting value of the write current adjusted by the write precompensation value adjustment section.

* * * * *